United States Patent
Thomas et al.

(10) Patent No.: US 7,182,409 B2
(45) Date of Patent: Feb. 27, 2007

(54) QUICK FASTENING WHEEL WEIGHT SYSTEM

(75) Inventors: Scott Thomas, Newburgh, IN (US); Andrew J. Zirkelbach, Evansville, IN (US)

(73) Assignee: SOP Services, Inc., Las Vegas, NV (US)

( * ) Notice: Subject to any disclaimer, the term of this patent is extended or adjusted under 35 U.S.C. 154(b) by 122 days.

(21) Appl. No.: 10/872,837

(22) Filed: Jun. 21, 2004

(65) Prior Publication Data

US 2005/0280308 A1  Dec. 22, 2005

(51) Int. Cl.
*B60B 15/28* (2006.01)

(52) U.S. Cl. ...................................... 301/53.5

(58) Field of Classification Search ............... 301/53.5; 280/758–759, 755
See application file for complete search history.

(56) References Cited

U.S. PATENT DOCUMENTS

| | | | |
|---|---|---|---|
| 1,487,257 A | 3/1924 | Mansfield | |
| 1,589,915 A | 6/1926 | Whitehead | |
| 2,536,459 A | 1/1951 | Oerman | |
| 2,606,075 A | 8/1952 | Roloff | |
| 2,699,362 A | 1/1955 | Sawyer et al. | |
| 2,784,036 A * | 3/1957 | Dubbe ........................ | 301/53.5 |
| 2,988,401 A * | 6/1961 | Matz ........................... | 301/53.5 |
| 3,644,002 A | 2/1972 | Barth et al. | |
| 3,658,369 A | 4/1972 | Barnes | |
| 3,675,530 A * | 7/1972 | Victor ......................... | 411/433 |
| 3,774,970 A | 11/1973 | Murphy et al. | |
| 3,922,018 A * | 11/1975 | Shook ....................... | 301/110.5 |
| 4,400,038 A * | 8/1983 | Hosokawa ................ | 301/124.2 |
| 5,116,106 A | 5/1992 | Hardesty et al. | |
| 5,513,622 A * | 5/1996 | Musacchia, Sr. ............. | 124/89 |
| 5,961,186 A * | 10/1999 | Phillips .................... | 301/124.2 |
| 6,099,011 A * | 8/2000 | Beaudoin et al. ........... | 280/292 |
| 6,132,007 A | 10/2000 | Harmsen | |
| 6,283,556 B1 | 9/2001 | Taylor | |
| 6,290,246 B1 * | 9/2001 | Lin ............................. | 280/204 |

FOREIGN PATENT DOCUMENTS

| | | |
|---|---|---|
| DE | 3210448 A1 * | 9/1983 |
| EP | 0 518 173 A2 | 12/1992 |
| GB | 2 244 460 | 4/1991 |
| JP | 59-134001 | 8/1984 |
| JP | 60-113776 | 6/1985 |

* cited by examiner

*Primary Examiner*—Jason R. Bellinger
(74) *Attorney, Agent, or Firm*—Woodard, Emhardt, Moriarty, McNett & Henry LLP (57) ABSTRACT

In one form, the present system includes a post mounted to a wheel, a weight directly supported by the post, and a quick release fastener connected to the post. The quick release fastener releaseably secures the weight on the post in a fixed position to the wheel. In another form, the present system includes a post mounted to a wheel wherein the post has a cavity, a weight supported by the post, and a quick release fastener. Further, the quick release fastener has a portion received by the cavity of the post and the quick release fastener releaseably secures the weight on the post in a fixed relation to the wheel.

27 Claims, 8 Drawing Sheets

QUICK FASTENING WHEEL WEIGHT SYSTEM

FIELD OF THE INVENTION

This invention relates generally to weight attachment systems for a vehicle, and more particularly to a weight system and method for securing weight to a wheel of a vehicle.

BACKGROUND OF THE INVENTION

Wheel weights are sometimes attached to the wheels on a vehicle to shift or move the center of gravity of the vehicle, prevent tipping of the vehicle, and/or to increase the wheel traction of the vehicle. For example, wheel weights are attached to the rear wheels of a tractor to counterbalance an excessive weight or load applied to the front end of the tractor. In another example, wheel weights are attached to the rear wheels of a vehicle to lower the center of gravity of the vehicle. Alternately, wheel weights are sometimes attached to the vehicle to increase the traction of the vehicle.

Traditionally, wheel weights are attached to the wheels with a fixed form of attachment, requiring tools, dexterity, time and often two people to secure or disconnect the wheel weights to the vehicle. After considerable effort, the fixed attachment and wheel weights are either attached to the vehicle or removed from the vehicle.

An improved wheel weight system is desired.

SUMMARY OF THE INVENTION

In one preferred configuration, the present invention includes at least one post mounted to a wheel. The invention also includes at least one weight supported by the post, and a quick release fastener connected to the post to releaseably secure the weight on the post and in a fixed position in relation to the wheel. In one embodiment, the quick release fastener comprises a moveable eccentric cam. In an optional feature, the post has a cavity configured to receive a portion of the quick release fastener. In a still further option, the cavity is threaded, and the portion of the quick release fastener extending into the cavity is at least partially threaded. In another embodiment, a plurality of posts are mounted to the wheel. In a still further embodiment, a plurality of weights are supported by the plurality of posts.

In yet another embodiment, the present invention comprises the steps of providing a post and a wheel, and securing the post to the wheel. Further, the present invention includes the steps of supporting a weight directly on the post, and securing the weight on the post in relation to the wheel with a quick release fastener. In one preferred embodiment, the invention includes extending a portion of the post through the wheel threading a nut onto the portion of the post extending through the wheel to secure the post to the wheel.

In a further embodiment, the present invention includes a weight kit including a kit container for holding at least two posts configured to be mounted horizontally to a vehicle wheel and at least one weight configured to be slidably received upon and supported by the posts. Each post has an end portion suitable for extending at least partially through the wheel. The kit container also holds at least two quick release locks operable with the posts to retain the weight from horizontally sliding on the posts. Preferably, the weight kit includes a fastener suitable for securing the end portions of the posts to the wheel.

It is an object of the invention to provide an improved wheel weight system.

Further objects, features and advantages of the present invention shall become apparent from the detailed drawings and descriptions provided herein.

DESCRIPTION OF PREFERRED EMBODIMENTS

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

In one basic configuration, the present weight system allows weight to be added to a vehicle to prevent tipping of the vehicle, assist in balancing, and/or assist in traction. In one embodiment the system includes a post mounted to a vehicle wheel. At least one weight is directly supported by the post. The present weight system preferably includes a quick release fastener that connects to the post to releaseably secure the weight on the post in a fixed position relative to the wheel. Further, the quick release fastener enables the user to quickly release the weight from the fixed position, thereby allowing the user to either remove the weight from the post or add additional weight to the post. Preferably, the quick release fastener and post arrangement allows one user to add or remove weight from a vehicle as desired without the assistance of tools or other people.

In another basic configuration, the present weight system includes a kit container for holding: at least two posts, at least one weight configured to be slidably received upon and supported by the posts, and at least two quick release locks. The posts are configured to be mounted horizontally to a vehicle wheel, and each post has an end portion suitable for extending at least partially through the wheel. The quick release locks are operable with the posts to retain the weight from horizontally sliding on the posts.

Figure 1:
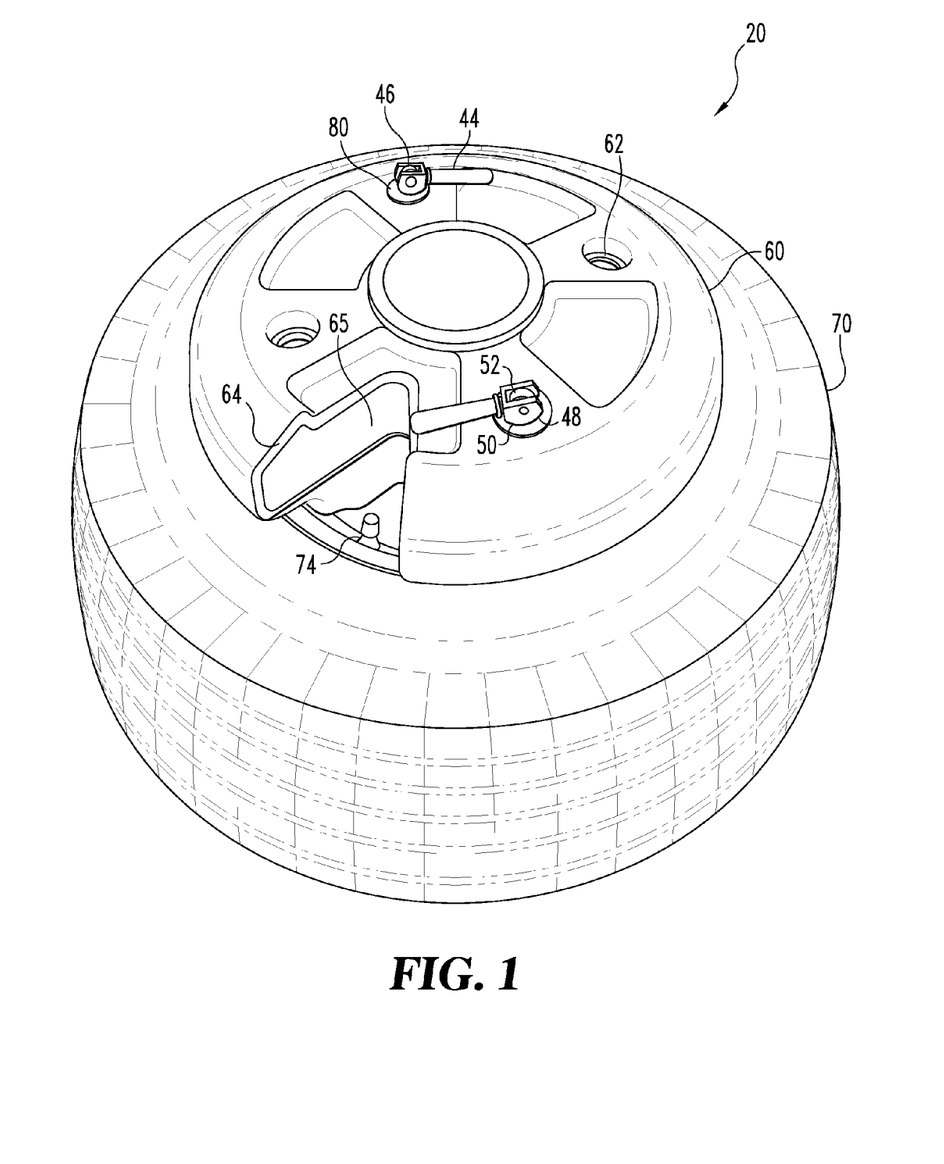
FIG. 1 illustrates a weight attachment system according to one preferred embodiment of the present invention.
Figure 2:
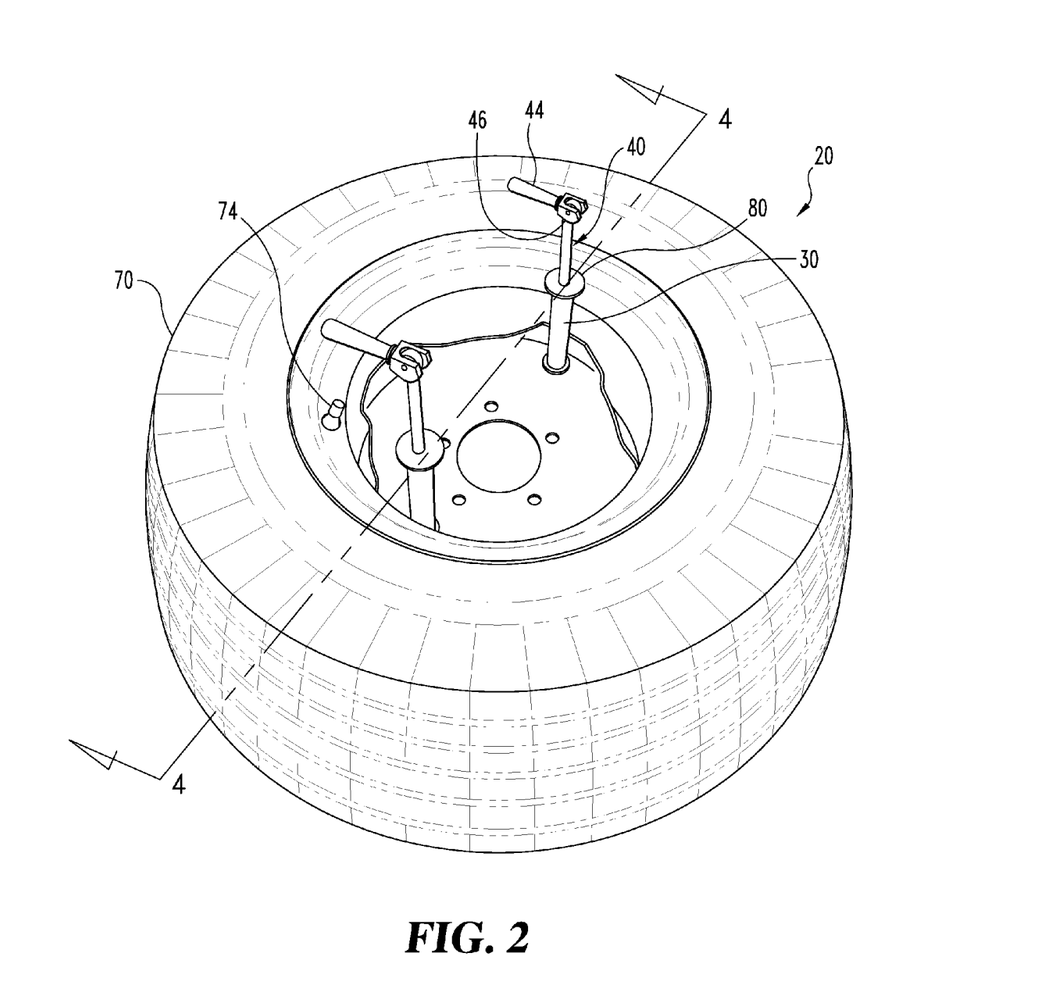
FIG. 2 illustrates a post, a quick release fastener, a washer, and a wheel according to a preferred embodiment of the present invention.

A weight attachment system according to one preferred embodiment of the present invention is illustrated in FIGS. 1 and 2. The weight attachment system 20 includes at least one post 30, at least one quick release fastener 40, weight 60, and an optional washer 80 for securing a weight 60 to a wheel 70.

Figure 3:
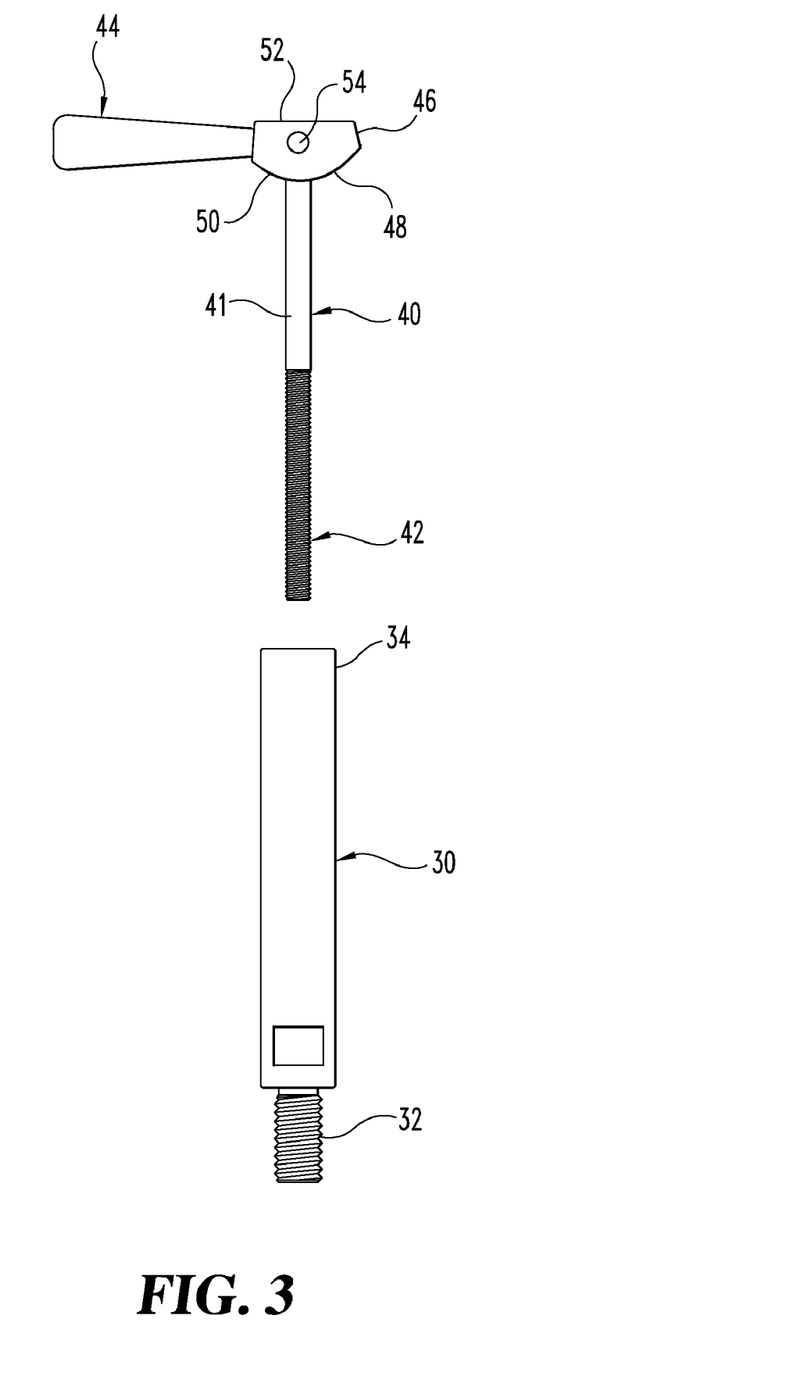
FIG. 3 illustrates a post and a quick release fastener according to an embodiment of the present invention.
Figure 4:
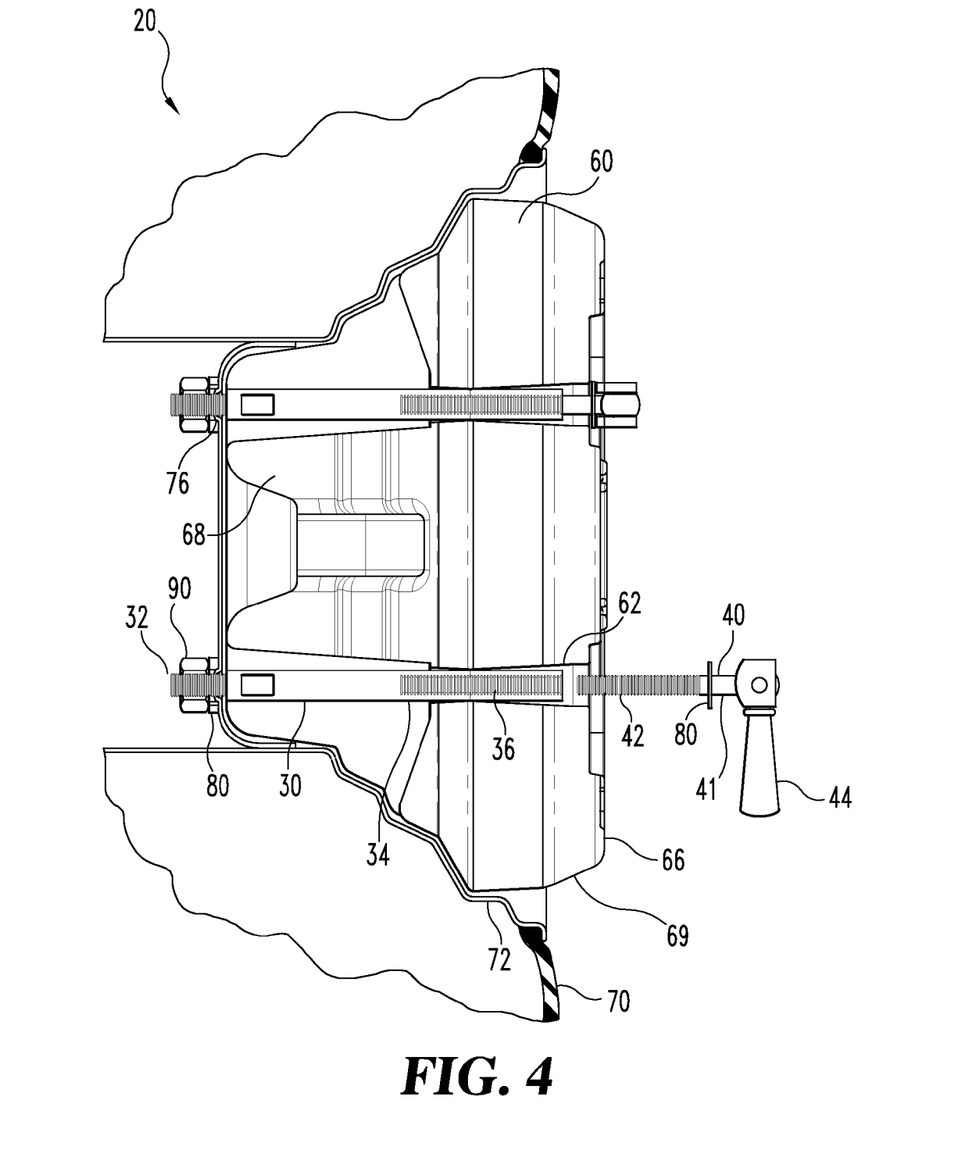
FIG. 4 is a cross section taken along line 4—4 in FIG. 2 with a wheel weight as shown in FIG. 1.

As shown in FIGS. 3 and 4, a post 30 has a first post end 32 and a second post end 34. In one form, second post end 34 has a passageway or cavity 36. In the illustrated embodiment, cavity 36 and first post end 32 are threaded. Further, cavity 36 and first post end 32 each have a circular cross-section. As illustrated, post 30 has an outside circular cross-section; however, alternate geometric shapes such as oval, square, hexagonal, or trapezoidal, to name a few, for post 30 can be used as desired. Post 30 may be various lengths as desired to receive one or more weights 60. Various materials may be used to form post 30, such as wood, plastic, or metal, to name a few. By way of non-limiting example, materials such as steel, stainless steel, aluminum, or brass could be used for metal.

In the embodiment illustrated in FIGS. 3 and 4, quick release fastener 40 has a shank 41 with post end 42 at one end and moveable cam 46 with a lever or arm 44 at the opposite end. In one form, the post end 42 has a circular cross-section with a threaded surface. In this form, the threaded surface of post end 42 aligns with the threaded cavity 36 of the post 30 such that the post cavity 36 threadably receives post end 42.

In the illustrated embodiment, the moveable cam 46 is an eccentric cam such that a pivot point 54 is eccentric to the periphery of the moveable cam 46. In one preferred embodiment, moveable cam 46 has a first radial edge 48, a second radial edge 50, and a flat edge 52. In certain embodiments, first radial edge 48 and second radial edge 50 have similar radii; however, the first radial edge 48 and the second radial edge 50 can have different radii. In another form, the first radial edge 48 and the second radial edge 50 have a similar length; however, the first radial edge 48 and the second radial edge 50 can be different lengths. Moveable cam 46 can be shaped differently, preferably in a manner where rotation of the cam changes the distance the cam edge overlaps shank 41, in order to provide tension to lock a weight 60 in place.

Lever 44 is used to rotate cam 46. In the illustrated embodiment, lever 44 has a substantially circular cross-section. In another form, lever 44 may be ergonomically shaped to receive a hand of a user. However, alternate geometric shapes such as oval, square, or rectangular, to name a few, for lever 44 can be used as desired. Various materials may be used to form quick release fastener 40, such as wood, plastic, or metal, to name a few.

Weight 60 (FIGS. 1 and 4) is preferably substantially circular in shape and is generally shaped to match the central portion of a wheel 70 typically extending towards a wheel rim 72 and optionally its hub. Alternate geometric shapes such as oval, square, or trapezoidal, to name a few for weight 60 can be used as desired. Weight 60 preferably includes at least one passageway 62 for receiving a post 30. In the illustrated embodiment, passageway 62 is circular in shape to match the cross section of the post 30; however, passageway 62 may be various geometric shapes as desired to receive the post 30. In one preferred option, weight 60 defines an open portion 65 allowing access to a tire inflation valve 74.

Weight 60 may be solid or hollow. In one embodiment, weight 60 includes an outer shell 64. Outer shell 64 may be made of various materials such as metal, molded plastic or rubber, to name a few and may be solid or filled with a weighting material. Various weighting materials can be used such as metal, concrete, sand or liquid.

FIG. 4 shows a wheel and weight 60 in a generally horizontal orientation. Weight 60 includes an outside surface 66, a tapered ring 68, and a wall 69. In one form, outside surface 66, tapered ring 68, and wall 69 form rounded corners at the connections. In one option (not shown), weight 60 is reversible, therefore the "outside" label is for illustration only. As shown, weight 60 is one weight, however, as an option, weight 60 could be a stack or plurality of weights. A plurality of weights are optionally arrangeable, so that one or more weights (with correspondingly longer posts) may be stacked and mounted for use as desired. Preferably the distance from the wheel hub to the weight's center of gravity is minimized to minimize outward tension on the wheel from the hub.

Wheel 70 normally includes a tire having a tire inflation valve 74. In a preferred embodiment, wheel 70 includes an opening 76 for partially receiving first post end 32 of post 30. Preferably wheel 70 includes a plurality of openings 76 arrangeable to align with a plurality of posts 30. In one form, as illustrated in FIG. 4, weight 60 is sized to sit entirely or partially within the wheel rim.

In one form of operation, the first post end 32 extends through the wheel as shown in FIG. 4. In the illustrated embodiment, a washer 80 is placed between the wheel and a nut 90. In a preferred embodiment the nut 90 and the first post end 32 are threaded such that the first post end 32 threadably receives the nut 90. In this embodiment the first post end 32 extends through the wheel and the nut 90 is threaded onto the first post end 32. In one option, a lock nut is used. In another form, a plurality of posts 30 are secured to the wheel with a plurality of washers 80 and a plurality of nuts 90. In a further embodiment, a plurality of posts 30 are spaced around the center of the wheel. It should be appreciated that wheel 70 can receive first post end 32 in other manners. By way of non-limiting example, first post end 32 can be welded or riveted onto wheel 70.

Preferably, one or more passageways 62 of weight 60 are aligned with the one or more posts 30 and the weight 60 is slid at least partially onto the posts 30. The weight 60 is directly supported on the posts 30. In another preferred embodiment, a user can optionally add another weight 60 to the post 30 or remove weight 60 from the post 30 and the wheel. The weight 60 is secured to the wheel with the quick release fastener 40.

The post end 42 of the quick release fastener 40 is inserted through weight passageway 62 and into the cavity 36 of the post 30. Preferably, the cavity 36 threadably receives the post end 42. The quick release fastener 40 includes an eccentric cam 46 and a lever 44, wherein a user can move the lever 44 and rotate the cam 46. By threadably tightening the quick release fastener 40 until almost tight, and then rotating the cam 46 to create tension to lock the cam 46 against the weight 60, the weight 60 on the post 30 is locked in a fixed position to the wheel 70. Optionally, in the illustrated embodiment a washer 80 is placed between the moveable cam 46 and the outer opening of passageway 62 in weight 60.

In a preferred embodiment the quick release fastener 40 is selectively releaseable and detachable from the post 30. In the illustrated embodiment, the lever 44 is rotated to unlock the moveable cam 46 and reduce the tension on weight 60. The post end 42 of the quick release fastener 40 is then removable from the cavity 36 so that weight 60 can be removed.

Figure 5:
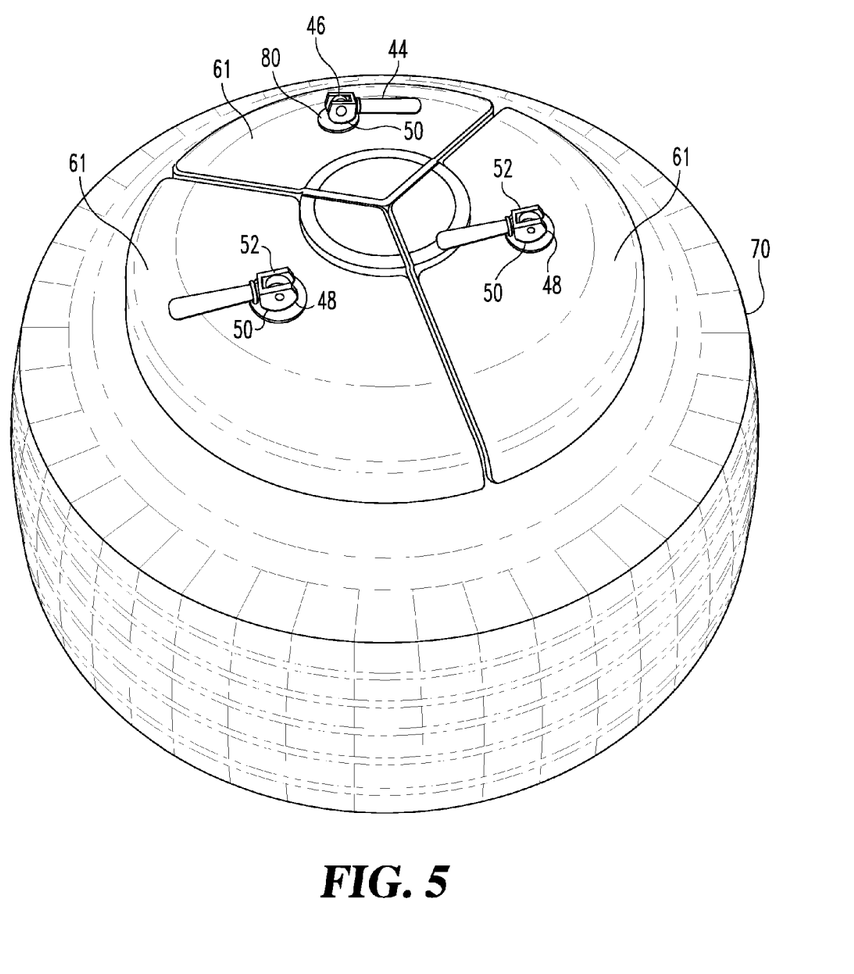
FIG. 5 illustrates a weight attachment system according to another preferred embodiment of the present invention.

An alternate preferred embodiment of a weight system is illustrated in FIG. 5. In this embodiment, each weight 61 is preferably pie-piece shaped, and a plurality of weights 61 are arranged in a pie shape to match the central portion of a wheel. Alternate geometric shapes for a plurality of weights such as oval, square, or trapezoidal can be used as desired. Less or more weights can be used, so long as the weights 61 are balanced around the periphery of the wheel and attached to the wheel.

As illustrated in FIG. 5, a plurality of weights 61, are supported by a plurality of posts 30 such that one weight 61 is supported by one post 30. The plurality of weights 61 are secured to the wheel 70 with a plurality of quick release fasteners 40 such that each weight 61 is secured by at least one quick release fastener 40. The plurality of weights 61 are preferably balanced around the wheel. Further, the plurality of weights 61 are preferably configured to sit entirely or partially within the wheel.

Figure 6:
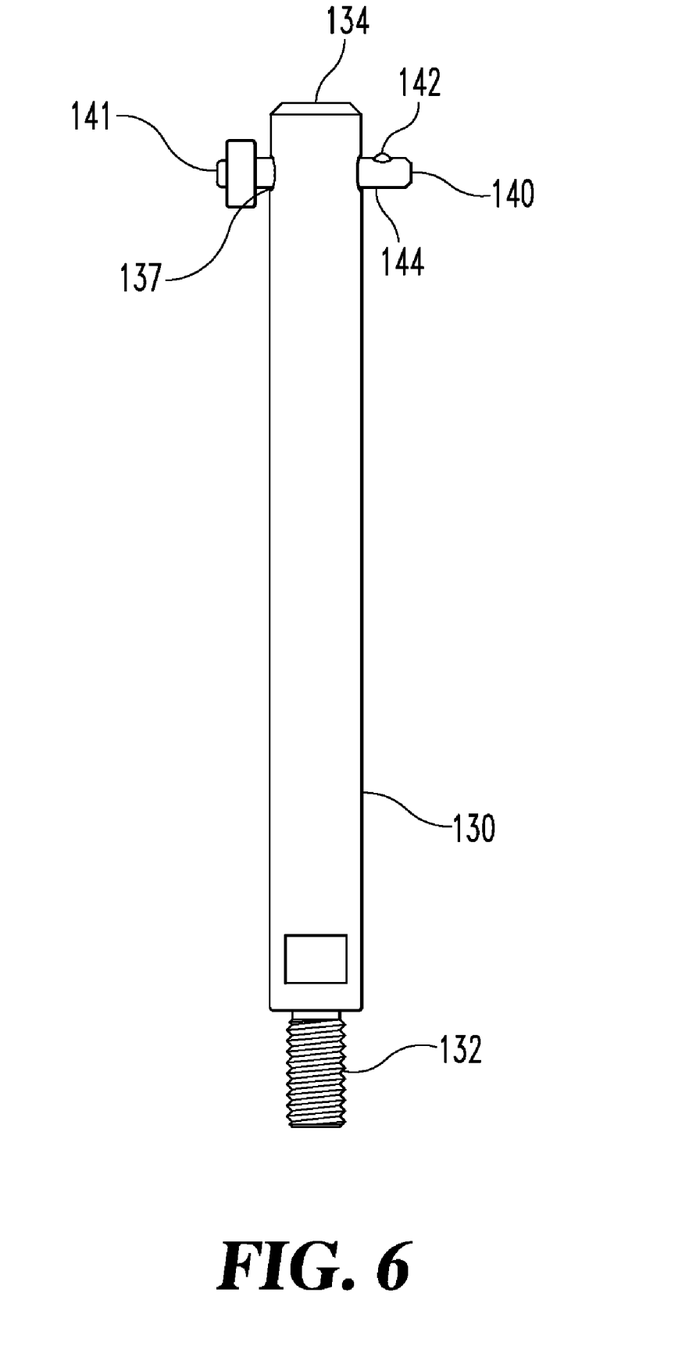
FIG. 6 illustrates a post and a quick release fastener according to an alternate embodiment of the present invention.
Figure 7:
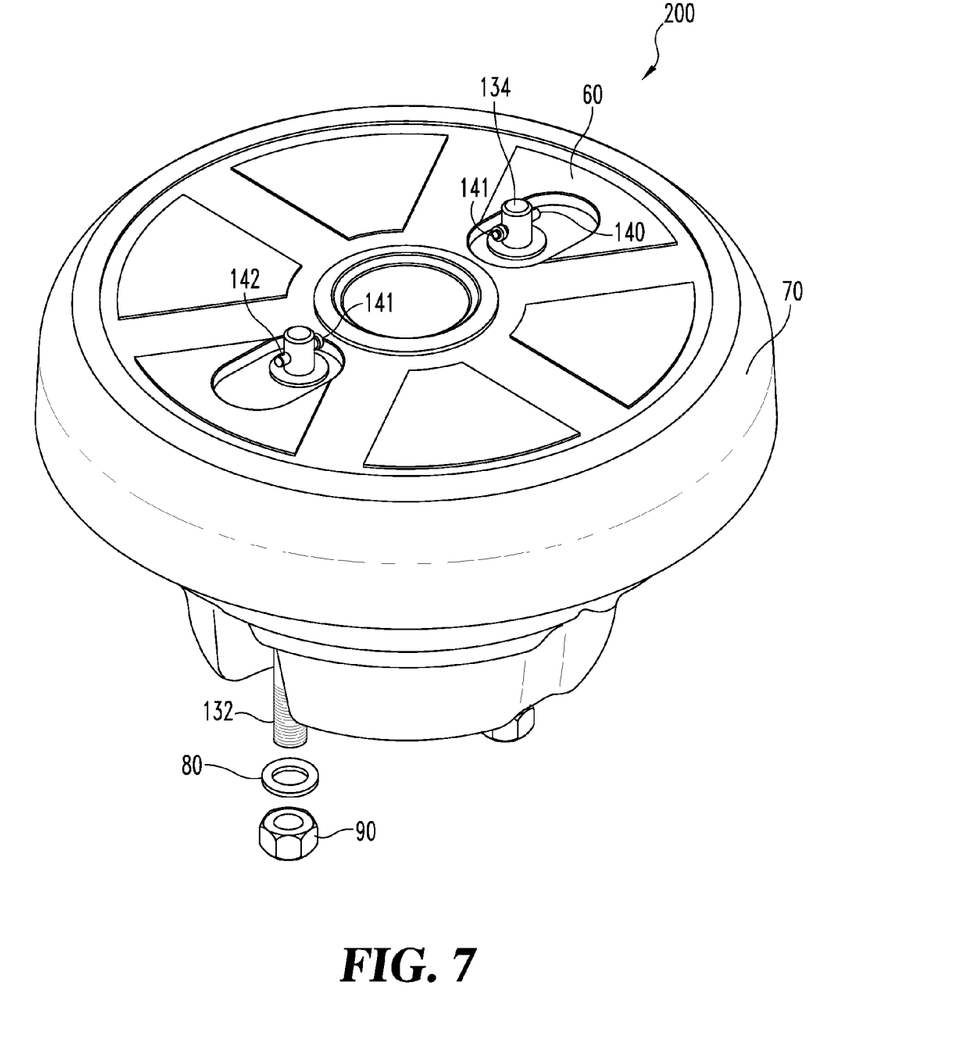
FIG. 7 illustrates a weight attachment system according to the alternate embodiment of the present invention.

An alternate preferred embodiment of a weight attachment system 200 is illustrated in FIGS. 6–7. Weight attachment system 200 includes at least one post 130 and a quick release fastener 140. Weight 60, wheel 70, and washer 80, are similar to those of weight attachment system 20.

As illustrated in FIG. 6, post 130 includes a first post end 132 and a second post end 134. First post end 132 is similar to first post end 32 of post 30 of weight attachment system 20 and is attachable to a wheel. Second post end 134 includes an opening or bore 137. Post 130 may be various lengths as desired to receive one or more weights 60. Various materials may be used to form post 130, such as wood, plastic, or metal, to name a few. By way of non-limiting example, metals such as steel, stainless steel, aluminum, or brass could be used.

In system 200, quick release fastener 140 includes a pushbutton 141, a ball bearing 142, and a shaft 144. Preferably, the post bore 137 is sized to receive and match the cross section of the shaft 144. The pushbutton 141 is moveable such that pushing the pushbutton allows the ball bearing 142 to depress inside the shaft 144. With ball bearing 142 depressed, shaft 144 is insertable through the opening 137 of the post 130.

The quick release fastener 140 operates to secure the weight 60 to the wheel. Preferably, after the weight 60 is situated on the post 130, the pushbutton 141 is depressed to retract ball bearing 142 such that the shaft 144 can slide through the opening 137. The shaft 144 is then inserted into the opening 137. Releasing pushbutton 141 causes ball bearing 142 to extend outward to lock the fastener from being removed.

When desired, a user can depress pushbutton 141 and remove the fastener 140. Optionally after the user removes fastener 140, the user can remove weight 60 from the post 130.

It should be appreciated that other forms of the quick release fastener 140 can be used. By way of non-limiting example, a split cotter pin, a split ring, a shaft and spiral ring or a clamp can be used as alternate types of quick release fasteners.

Figure 8:
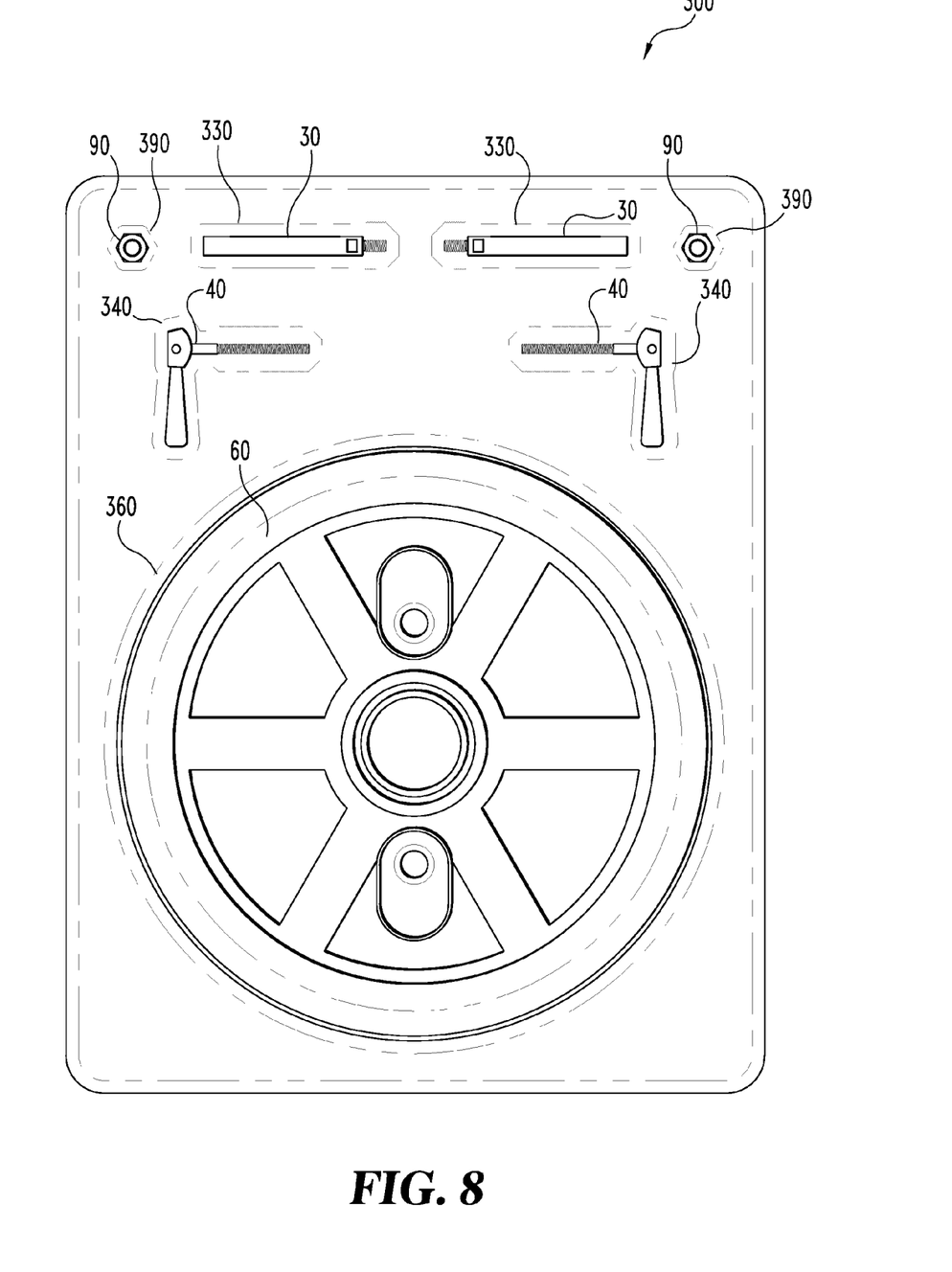
FIG. 8 illustrates a weight kit according to an embodiment of the present invention.

A weight kit according to one embodiment of the present invention is illustrated in FIG. 8. In the illustrated embodiment, the weight kit includes a kit container 300, at least one post 30, at least one quick release fastener 40, at least one weight 60, and at least one nut 90. It should be appreciated that kit container 300 can alternately include post 130 and quick release fastener 140. In another form, the kit container 300 includes a post opening 330 for storing the post 30, a quick release fastener opening 340 for storing the quick release fastener 40, a weight opening 360 for storing the weight 60, and a nut opening 390 for storing the nut 90. In other forms, the kit container 300 can include other openings for storing additional posts 30, quick release fasteners 40, weights 60, and/or other items.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A weight attachment apparatus, comprising:
    a. at least one post mounted to a wheel wherein said post defines a first post end on a side of the wheel opposite to said weight, wherein said first post end is threaded, and a nut threaded onto said first post end;
    b. at least one weight supported by said post; and
    c. a quick release fastener connected to said post to releaseably secure said weight on said post in a fixed position to the wheel wherein said post has a cavity configured to receive and engage a portion of said quick release fastener to secure said quick release fastener to said post.

2. The weight attachment apparatus of claim 1, wherein said quick release fastener comprises a moveable eccentric cam pivotally mounted to said quick release fastener portion secured to said post.

3. The weight attachment apparatus of claim 1, wherein a portion of said post extends through the wheel.

4. The weight attachment apparatus of claim 1, wherein said cavity is threaded and said portion of said quick release fastener extending into said cavity is at least partially threaded.

5. The weight attachment apparatus of claim 1, further comprising a plurality of posts mounted to the wheel.

6. The weight attachment apparatus of claim 5, further comprising a plurality of weights supported by said plurality of posts.

7. A system, comprising:
    a. a vehicle having one or more wheels;
    b. at least one post mounted to at least one of said wheels wherein a portion of said at least one post extends through said wheel and wherein said portion is secured to said wheel using a removable fastener;
    c. at least one weight supported by said at least one post; and,
    d. a quick release fastener having a post portion connected to said at least one post and an eccentric cam pivotally mounted to said post portion;
    e. wherein said quick release fastener releaseably secures said weight, with said eccentric cam abutting said weight when engaged, to secure said weight on said at least one post between said eccentric cam and said wheel.

8. The system of claim 7, wherein said weight comprises at least one passageway configured to receive said at least one post.

9. The system of claim 7, wherein said weight comprises at least one open portion suitable for allowing access to a tire inflation valve on a tire mounted to said wheel.

10. The system of claim 7, wherein said removable fastener is at least one nut threaded onto said portion of said at least one post extending through said wheel opposite said weight, wherein said portion is configured to receive said at least one nut.

11. The system of claim 7, wherein said at least one post has a cavity configured to receive a portion of said quick release fastener.

12. The system of claim 7, comprising a plurality of weights directly supported by a plurality of posts mounted to said at least one wheel.

13. The system of claim 12, wherein said plurality of weights are configured to at least partially fit within said one or more wheels.

14. A method, comprising the steps of:
 a. providing a post and a wheel:
 b. securing said post to said wheel with a fastener on one side of said wheel;
 c. supporting a weight directly on said post on a side opposite said fastener; and
 d. securing said weight on said post to said wheel with a quick release fasteners, wherein said quick release fastener includes a pivotally mounted eccentric cam engaged to said post, with said eccentric cam abutting said weight when engaged to secure said weight between said eccentric cam and said wheel.

15. The method of claim 14, wherein said securing said post to said wheel comprises extending a portion of said post through said wheel and threading a nut onto said portion of said post extending through said wheel to secure said post to said wheel.

16. The method of claim 15, wherein supporting said weight includes aligning a passageway of said weight with said post and sliding said weight onto said post.

17. The method of claim 14, further comprising connecting a quick release fastener to said post and inserting a portion of said quick release fastener into a cavity of said post.

18. The method of claim 17, wherein said quick release fastener comprises a moveable cam.

19. A weight kit for a vehicle wheel, comprising:
 a. a kit container, holding:
 b. a pair of posts configured to be mounted horizontally to a vehicle wheel, wherein each post has an end portion suitable for extending at least partially through said wheel;
 c. a pair of fasteners suitable for securing said end portions of said pair of posts to said wheel;
 d. at least one weight configured to be slidably received upon and supported by said pair of posts; and
 e. a pair of quick release locks operable with said pair of posts to retain said at least one weight from horizontally sliding on said pair of posts wherein said pair of posts each have a cavity and said pair of quick release locks each have a component internally received in said cavity of a corresponding post.

20. The weight kit of claim 19, wherein said end portions of said pair of posts are threaded and said pair of fasteners are nuts threadably received on said end portions.

21. The weight kit of claim 19, wherein said cavities and said components are threaded, and said components are each threadably received in said cavity of said corresponding post.

22. The weight kit of claim 19, wherein said pair of quick release locks are eccentric cam locks.

23. The weight kit of claim 19, wherein said weight includes an outer shell of molded plastic.

24. The weight kit of claim 19, wherein said kit container includes a pair of openings suitable for receiving said pair of posts.

25. The weight kit of claim 19, wherein said kit container includes a pair of openings suitable for receiving said pair of quick release locks.

26. The weight kit of claim 19, wherein said kit container includes at least one opening suitable for receiving said at least one weight.

27. A weight kit for a vehicle wheel, consisting essentially of:
 a. a kit container, holding:
 b. a pair of posts configured to be mounted horizontally to a vehicle wheel, wherein each post has an end portion suitable for extending at least partially through said wheel;
 c. one weight configured to be received on and supported by said pair of posts;
 d. a pair of fasteners suitable for securing said end portions of said pair of posts to said wheel; and
 e. a pair of quick release locks with eccentric cams operable with said pair of posts to releaseably secure said at least one weight on said pair of posts between said eccentric cams and said wheel, wherein said pair of posts each have a cavity and said pair of quick release locks each have a component internally received in said cavity of a corresponding post.

* * * * *